UNITED STATES PATENT OFFICE.

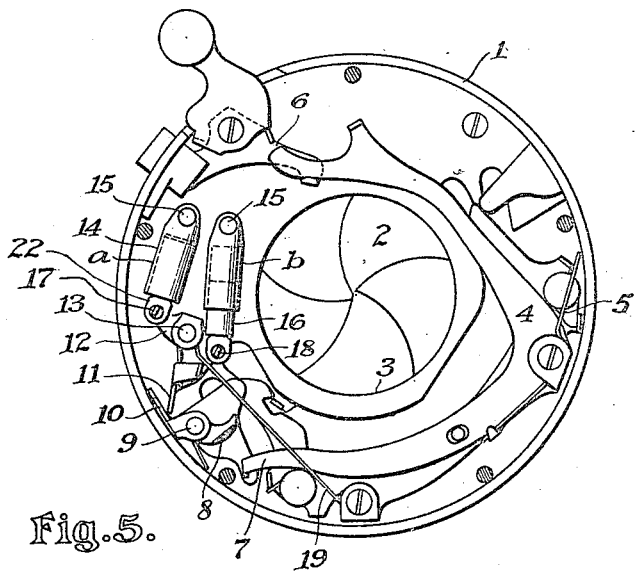
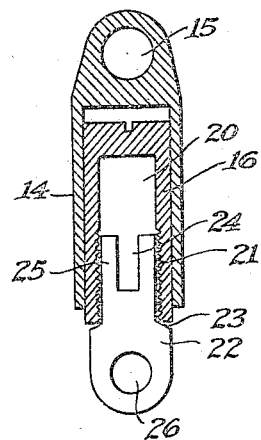
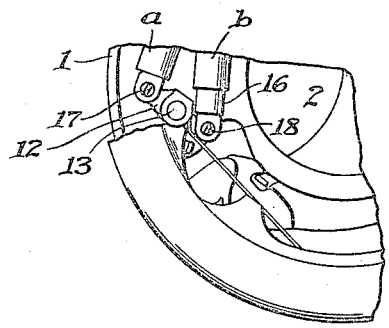
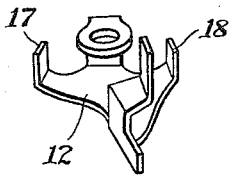
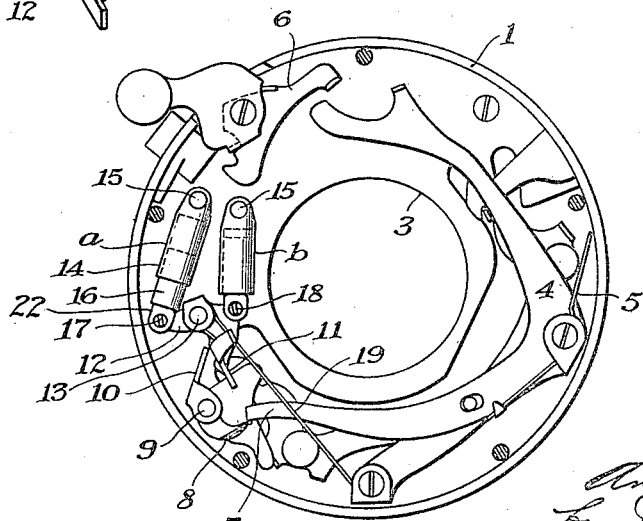
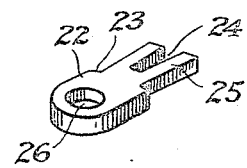

ANDREW WOLLENSAK, OF ROCHESTER, NEW YORK, ASSIGNOR TO WOLLENSAK OPTICAL COMPANY, OF ROCHESTER, NEW YORK, A CORPORATION OF NEW YORK.

RETARDER FOR PHOTOGRAPHIC SHUTTERS.

1,266,649.  Specification of Letters Patent.  Patented May 21, 1918.

Application filed August 9, 1916. Serial No. 113,912.

*To all whom it may concern:*

Be it known that I, ANDREW WOLLENSAK, a citizen of the United States, and resident of Rochester, in the county of Monroe and State of New York, have invented certain new and useful Improvements in Retarders for Photographic Shutters, of which the following is a specification.

The present invention relates to photographic shutters and more particularly to the retarding mechanism for delaying the action of the master or motor member of the shutter so that the time of exposure may be varied, an object of this invention being to provide a retarding mechanism employing a dash pot construction which may be cheaply manufactured and easily assembled.

To these and other ends, the invention consists in certain parts and combinations of parts all of which will be hereinafter described, the novel features being pointed out in the appended claims.

In the drawings:

Figure 1 shows portions of a shutter with the improved retarding mechanism connected thereto and arranged in normal position;

Fig. 2 is a view similar to Fig. 1 showing the retarding mechanism in its position when it is about to release the master or motor member;

Fig. 3 is a detail view showing the manner of controlling the retarding mechanism;

Fig. 4 is an axial section through one of the dash pots;

Fig. 5 is a detail view of the two armed lever which connects the dash pots; and Fig. 6 is a perspective view of a detail.

The invention is herein shown as embodied in a shutter of the type illustrated in an application filed by me on the 9th day of March, 1916, Serial No. 83,180. To illustrate the entire shutter would involve a needless number of drawings so only those parts of the shutter which coöperate with the retarding mechanism will be shown and described. The casing 1 has the shutter blades 2 for the exposure aperture 3, the shutter blades being controlled by a master or motor member 4 in the manner set forth in the hereinbefore mentioned application, the motor member having the motor or master spring 5 acting thereon to move said master member in one direction for the purpose of opening and closing the shutter blades, the movement in the other direction being effected by the operating member 6.

While the master member is moving under the action of the spring 5, its end 7 coöperates with an arm 8 on the lever which is pivoted at 9 to the shutter casing. This lever also has an arm 10 for engagement with an arm 11 on a double arm lever 12 which is pivoted at 13 to the shutter casing. To this lever may be connected dash pots *a* and *b*, each embodying in this instance a cylinder 14 pivoted at 15 and having a piston 16 operating therein and pivotally connected to the lever 12, the pivot of the dash pot *a* being indicated at 17 and that of the dash pot *b* being indicated at 18. A spring 19 acts on the lever 12 in order that normally the piston of the dash pot *a* will be moved into the cylinder while that of the dash pot *b* will be withdrawn from the cylinder. This causes the arm 11 to act on the lever arm 10 and throw the arm 8 of said last mentioned lever into a normal position in the path of the end 7 of the master lever.

Another feature of this invention is the manner of forming the piston of the retarding device so that it may be inexpensively manufactured. The piston 16 is formed with a cylindrical bore 20 which is internally threaded at 21 near one end, and the rod 22 of the piston is formed by a stamped plate with shoulders 23 on opposite sides and having one end slotted at 24 to provide two spring tongues 25 which are spread slightly. This piston rod is introduced into the bore of a piston and the slight spreading of the tongues 25 together with the screw threads 21 provide a binding action which will retain the piston rod within the piston for a working operation of the latter. By this arrangement, the turning of the piston rod, together with the drilling of a hole, is eliminated as the plate 22 with its hole 26 and slot 24 may be formed in one operation of stamping. The assembling of the parts is also easy.

What I claim as my invention and desire to secure by Letters Patent is:

1. In a photographic shutter, a retarding dash pot having a piston formed with an internally threaded bore and a piston rod having two spring tongues fitting in said bore.

2. A retarding dash pot for photographic shutters comprising a piston having an internally threaded bore and a plate piston rod having a slotted end fitted in said bore, said rod also having shoulders on opposite sides for limiting the inward movement of the plate.

ANDREW WOLLENSAK.

Copies of this patent may be obtained for five cents each, by addressing the "Commissioner of Patents, Washington, D. C."